D. L. STROUD.
ATTACHMENT FOR MOTOR VEHICLES.
APPLICATION FILED AUG. 13, 1919.

1,345,278.

Patented June 29, 1920.
4 SHEETS—SHEET 1.

WITNESSES
George A. Nyus.
C. E. Trainor.

INVENTOR
D. L. STROUD,
BY
ATTORNEYS

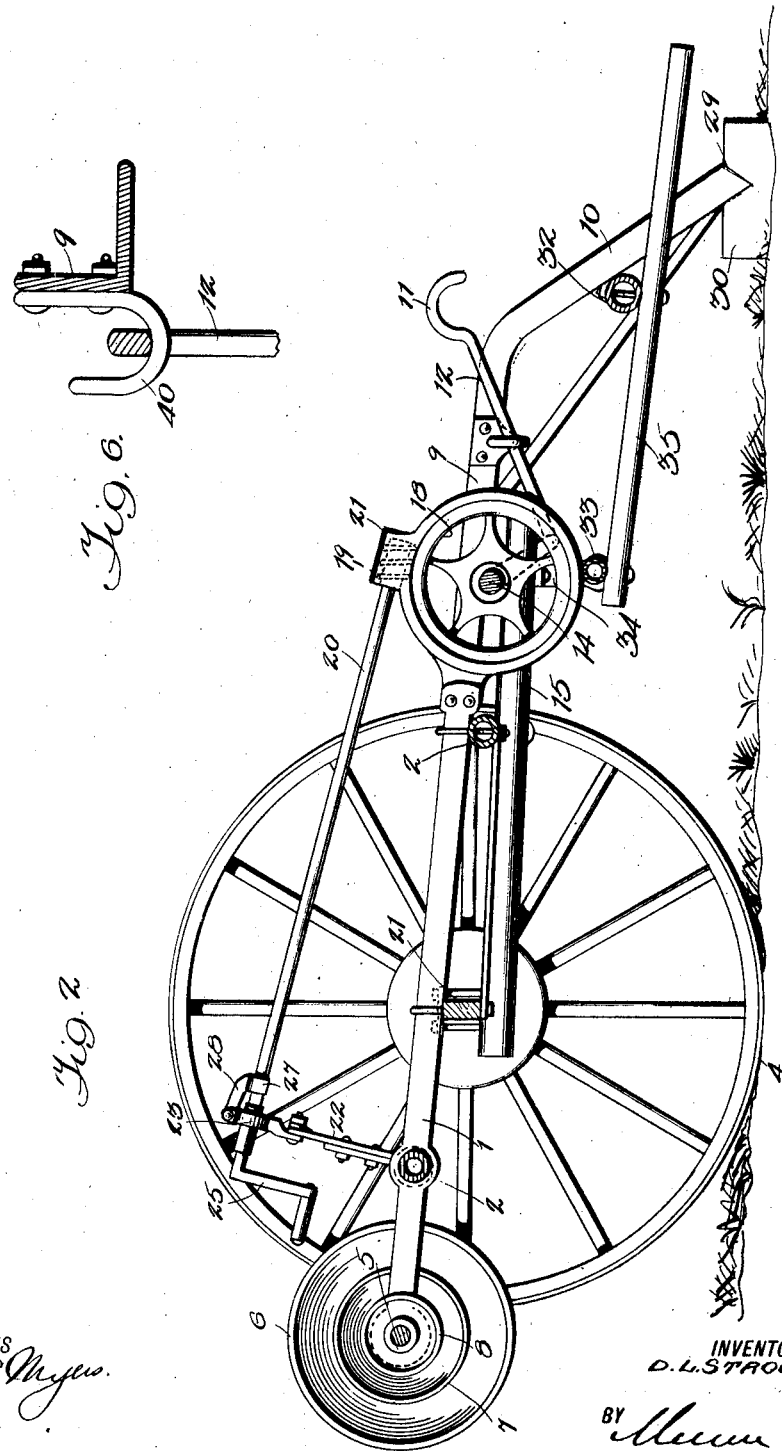

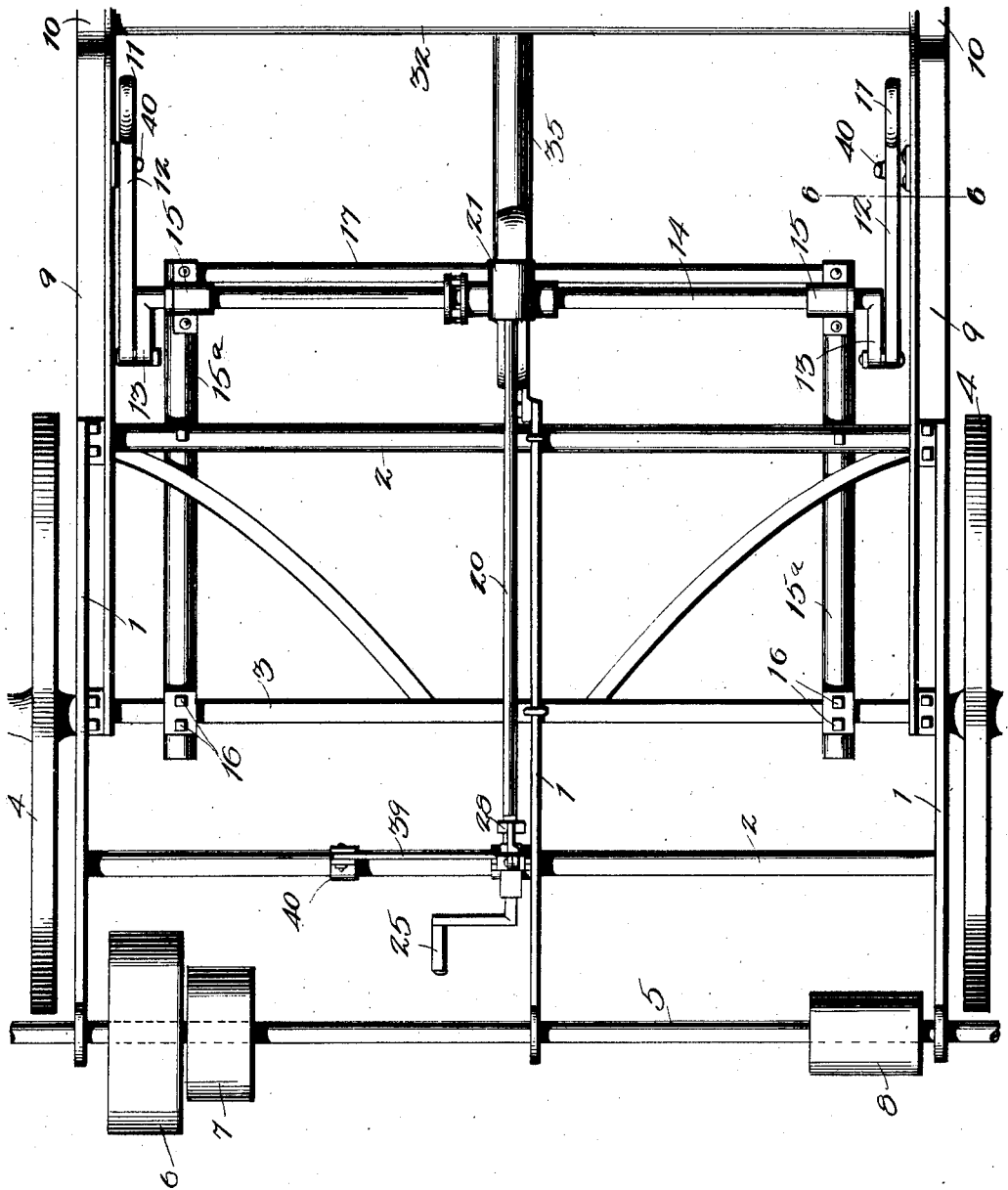

D. L. STROUD.
ATTACHMENT FOR MOTOR VEHICLES.
APPLICATION FILED AUG. 13, 1919.
1,345,278.
Patented June 29, 1920.
4 SHEETS—SHEET 4.
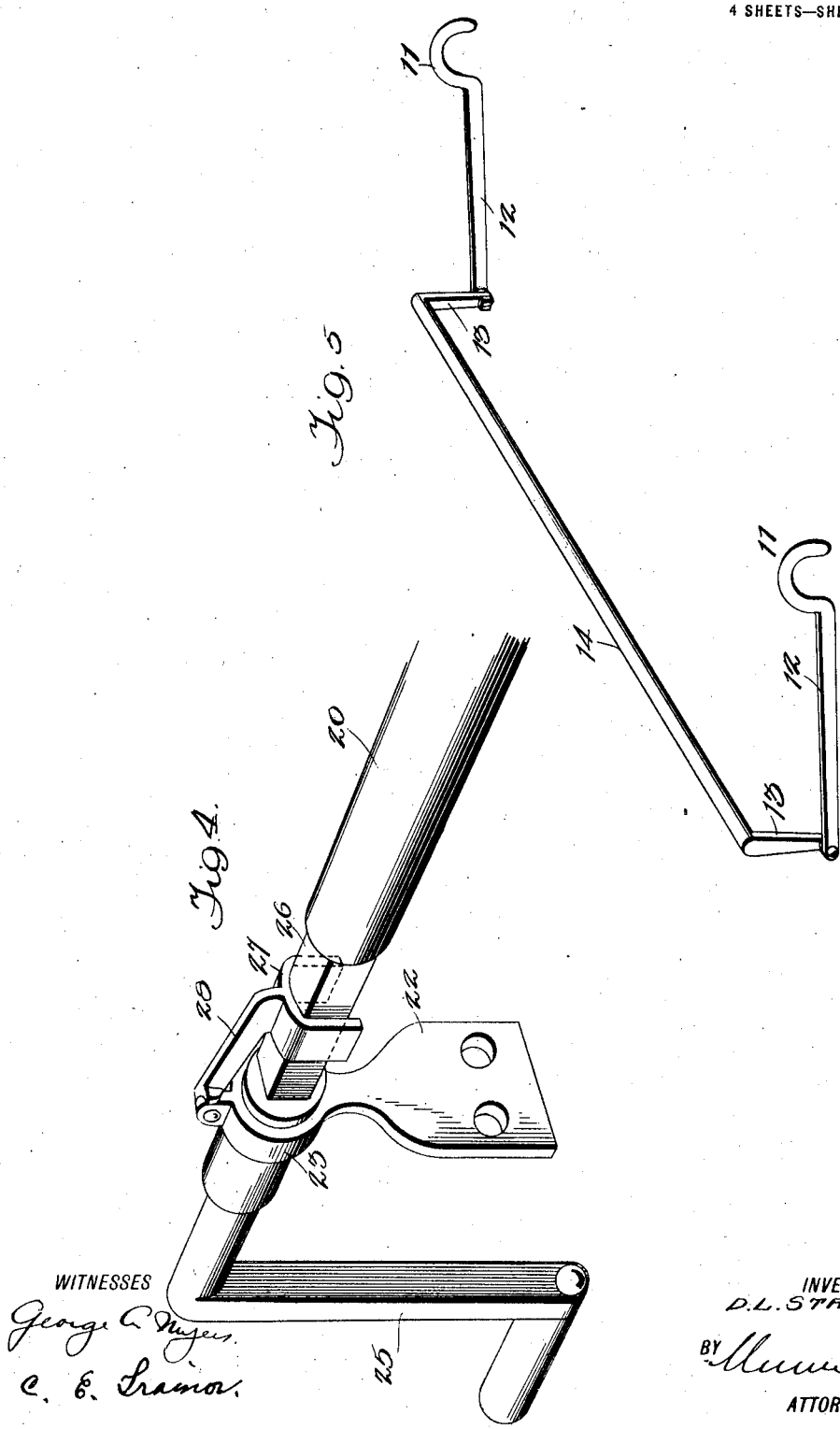
WITNESSES
INVENTOR
D. L. STROUD,
BY
ATTORNEYS

UNITED STATES PATENT OFFICE.

DAVID L. STROUD, OF MABEL, MINNESOTA.

ATTACHMENT FOR MOTOR-VEHICLES.

1,345,278.　　　　　Specification of Letters Patent.　　Patented June 29, 1920.

Application filed August 13, 1919. Serial No. 317,301.

*To all whom it may concern:*

Be it known that I, DAVID L. STROUD, a citizen of the United States, and a resident of Mabel, in the county of Fillmore and State of Minnesota, have invented certain new and useful Improvements in Attachments for Motor-Vehicles, of which the following is a specification.

My invention is an improvement in attachments for motor vehicles, and has for its object to provide an attachment of the character specified adapted to support the rear wheels of a motor vehicle out of contact with the ground, to permit them to rotate freely to drive machinery of any character, and wherein means is provided on the said attachment for permitting the rear end of the vehicle to be quickly and easily lifted on to the attachment to support the rear wheels for running freely.

In the drawings:

Fig. 2 is a longitudinal vertical section of the attachment;

Fig. 3 is a plan view of the attachment;

Fig. 4 is a detail perspective view of the crank locking mechanism;

Fig. 5 is a similar view of the hooks and their connection;

Fig. 6 is a section on the line 6—6 of Fig. 3.

Figure 1:
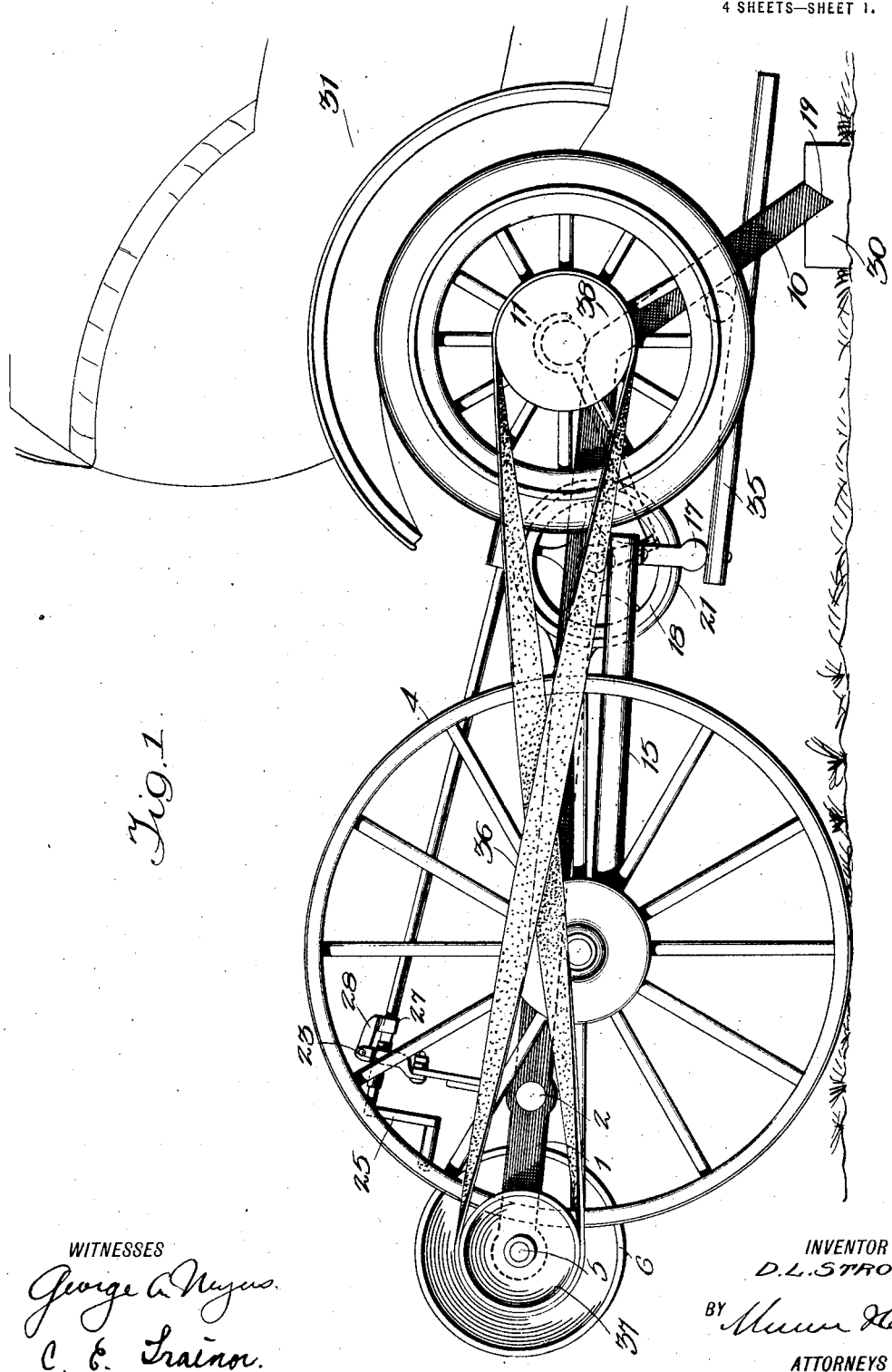
Figure 1 is a side view of the attachment in use.

In the present embodiment of the invention the attachment comprises a suitable supporting frame composed of longitudinal plates 1 and connecting cross rods or pipes 2, and an axle 3 is secured to the frame, the axle having wheels 4 at its ends. A shaft 5 is journaled in the rear ends of the plates 1, and this shaft carries near one end a pair of pulleys 6 and 7 of unequal size, and at the other a pulley 8.

The frame has a forward extension, consisting of plates 9 of angle material, which are secured to the front cross bar 2 and to the axle 3, on the inner side of the plates 1, and these plates 9 have downwardly inclined portions 10 at their forward ends, the said portions 10 forming inclines up which the rear axle of the motor vehicle may be moved.

The axle is adapted to be moved up these inclines by means of hooks 11 on the forward ends of links 12 which are connected at their rear ends to crank arms 13 on a shaft 14 journaled in bearings 15 on an auxiliary frame supported below the main frame. This auxiliary frame comprises rods or pipes 15ª which are secured to the axle by clips 16, and to the forward cross bar 2, and the pipes 15 are connected at their front ends by a cross pipe 17.

The shaft 14, as shown, is journaled on top of the forward ends of the pipes 15, and it is provided intermediate its ends with a worm wheel 18 which is engaged by a worm 19 on a driving shaft 20. This shaft is journaled at its forward end in a housing 21 which incloses the wheel 18 and the worm 19, and at its rear end in a bracket arm 22 secured to the rearmost cross pipe 2 and extending upwardly therefrom. The bracket plate 22 is sectional, the sections being detachably connected as shown in Fig. 2, and at its upper end the bearing plate carries a bearing 23 in which the shaft 20 is journaled.

This shaft, as shown in Fig. 4, has a crank 25 at its rear end and it has a reduced polygonal portion 26 near the crank, the said portion being square in the present instance. This square portion is adapted to be engaged by a substantially U-shaped holder 27 on the forward end of an arm 28 which is pivoted to the bearing 23. It will be evident that when the holder is dropped over the polygonal portion of the shaft, as shown in Fig. 4, the shaft will be held from rotation, while when the arm is swung upwardly the shaft will be released. The forward ends of the inclined portions 10 of the angle bars are adapted to rest in notches 29 in blocks 30 which are adapted to be seated on the ground adjacent to the rear axle of the motor vehicle, indicated at 31.

The inclined portions 10 of the angle plates 9 are connected near their centers by a cross pipe 32 and a second cross pipe 33 is arranged near the front ends of the pipes 15, being supported by depending arms 34 from the said pipes 15. A pipe 35 connects the centers of the pipes 32 and 33 and extends forwardly beyond the inclined portions as shown in Figs. 1 and 2.

Belts 36 are provided for connecting wheels 37 at the ends of the shaft 5 with wheels 38 which are secured to the hubs of the rear wheels of the vehicle in any suitable or desired manner. It will be evident that when the rear axle of the vehicle is supported on the bodies of the plates 9 the wheels will be out of contact with the ground and the power of the motor of the vehicle may be applied directly to the shaft 5. Power may be taken from this shaft through the pulleys 6, 7 and 8. The bracket 22 is braced against the pipe 2 by means of an inclined brace 39 which is secured to a clip 40 on the pipe at one end and to the bracket plate at the other.

In operation, the vehicle is backed up to the attachment, until the rear axle is against the inclined portions 10 of the plates 9. The hooks 11 are then engaged with the housing of the rear axle, after which the shaft 20 is turned by means of the crank 25. This turns the shaft 14, swinging the arms 13 rearwardly and moving the links 12 also rearwardly, thus drawing the rear axle up the inclined portions 10 of the plates 9 until the wheels are out of contact with the ground. By means of the holder 27 the shaft may be locked with the plates in this position. The links 12 pass through hangers 40 supported by the plates 9 to prevent downward swinging thereof at their forward ends. Very little power is required to move the vehicle, as above mentioned, because of the worm gear connection.

Since the attachment is wheel supported it will be obvious that it may be transported to wherever desired, and may be run up to the rear of the vehicle, instead of backing the vehicle to the attachment.

I claim:

1. An attachment of the character specified comprising a supporting frame having inclines at its forward end up which the rear axle of the motor vehicle is adapted to be drawn, means for engaging the axle of the vehicle, means for moving the engaging means to draw the axle up the incline, said means comprising a shaft journaled transversely of the frame and having radial arms at its ends, links connected with the arms and having hooks for engaging the axle housing, a worm wheel on the shaft, a driving shaft journaled on the frame and having a worm for engaging the worm wheel, and means engaging the driving shaft for preventing reverse rotation thereof.

2. An attachment of the character specified comprising a supporting frame having inclines at its forward end up which the rear axle of the motor vehicle is adapted to be drawn, means for engaging the axle of the vehicle, means for moving the engaging means to draw the axle up the incline, said means comprising a shaft journaled transversely of the frame and having radial arms at its ends, links connected with the arms and having hooks for engaging the axle housing, a worm wheel on the shaft, and a driving shaft journaled on the frame and having a worm for engaging the worm wheel.

3. An attachment of the character specified comprising a supporting frame having inclines at its forward end up which the rear axle of the motor vehicle is adapted to be drawn, means for engaging the axle of the vehicle, and means for moving the engaging means to draw the axle up the incline, said means comprising a shaft journaled transversely of the frame and having radial arms at its ends, and links connected with the arms and having hooks for engaging the axle housing.

DAVID L. STROUD.